C. F. ECKART.
METHOD OF ENHANCING GROWTH OF PLANTS.
APPLICATION FILED JUNE 12, 1920.
1,372,997.
Patented Mar. 29, 1921.
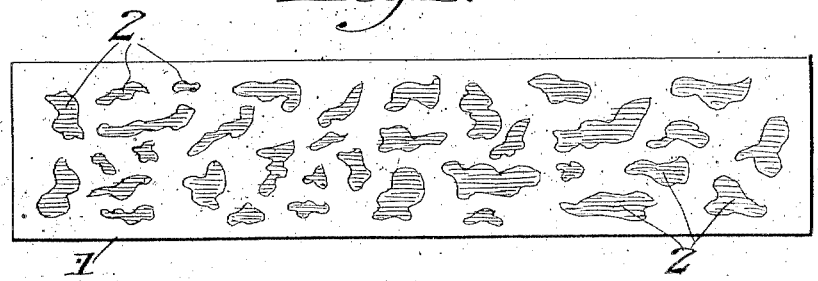
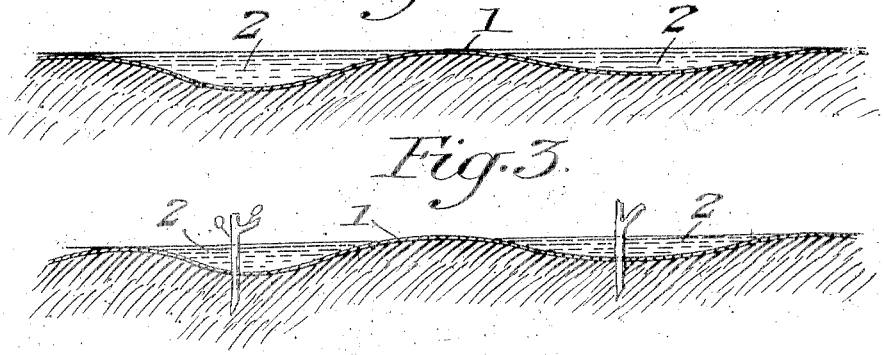
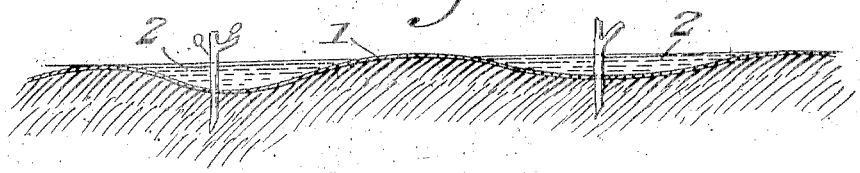
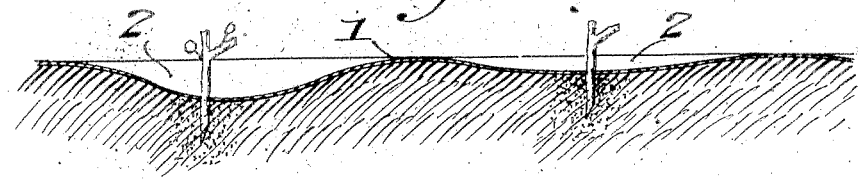
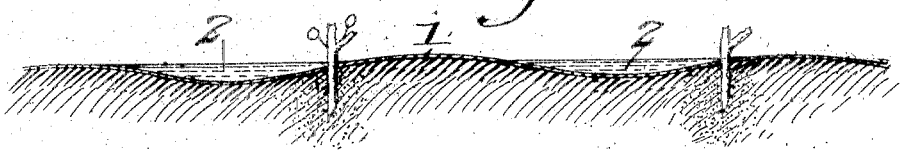
Inventor
Charles F. Eckart

UNITED STATES PATENT OFFICE.

CHARLES F. ECKART, OF OLAA, TERRITORY OF HAWAII.

METHOD OF ENHANCING GROWTH OF PLANTS.

1,372,997.   Specification of Letters Patent.   Patented Mar. 29, 1921.

Application filed June 12, 1920. Serial No. 388,435.

*To all whom it may concern:*

Be it known that I, CHARLES F. ECKART, a citizen of the United States, residing at and whose post-office address is Olaa, Hawaii, Territory of Hawaii, have invented certain new and useful Improvements in Methods of Enhancing Growth of Plants; and I do hereby declare the following to be a full, clear, and exact description of the invention, such as will enable others skilled in the art to which it appertains to make and use the same.

The present invention relates to a new and improved method for enhancing the growth and development of plants from slips, cuttings and similar planting stock, by preventing the growth of weeds in or about the planting area, by means of a covering or mulsh, preferably of flexible, water-proof, heat-absorbing material, superimposed on the planting area, and the formation of hollows or depressions in the body of the cover, to collect and retain water, either from rains or applied artificially. The plant producing stock is planted by forcing the ends of the same through the covering, within the areas forming the depressions, into the soil so that any water which may be within the depressions or subsequently collects therein will seep through the opening about the stem of the slip or cutting and produce a condition of moisture in the soil highly beneficial to the rooting and subsequent growth and development of the plant.

A broadly analogous method has been described in my co-pending application, Serial Number 325,721, filed September 23, 1919, which, however, differs from the present method in certain essential particulars. Briefly stated, the method described in the co-pending application, involves the freeing of the soil area from weeds by hastening the germination of the said weeds and bulbs and smothering the resulting weed plants, by means of an opaque water-proof covering which is superimposed on the soil surface, and, following the destruction of the weeds, the making of suitable openings in the covering and the setting out of the plants or plant producing stock in the weed-freed areas of the soil thus exposed through the openings. This method, while highly efficacious and productive of entirely satisfactory results, nevertheless, entailed the expenditure of a preliminary period of time, varying from a few days to five weeks, for exterminating the weeds, before the actual planting operation could be effected. According to the present invention, however, the covering or mulshing of the planting area to ultimately destroy the weeds, and the setting out of the plant stock may be effected without any material interval of time intervening between the operations, it being only necessary to produce or permit to be produced or formed in the covering, a series of depressions, conforming roughly to the contour of the subjacent ground, by the application of water, either from natural rains or by artificial means as by sprinkling the surfaces of the coverings, thereby causing the flexible material of the covering to sag into the depressions of the ground and form basin-like depressions in which the water collects and remains. The uneven extension of parts of the covering after it has become wet, with the consequent wrinkling induced, likewise causes the formation of a multitude of small basin-like areas on the covering. After the depressions have been formed, and either while the latter contain the water, or, if desired, after the water has evaporated, the plant slips or cuttings are forced through the material into the soil within the depression areas and the covering is allowed to remain in position during the subsequent growth and development of the plants. According to the present method, therefore, a material saving in time in the mulshing and planting operations is effected, the development of any weeds whatever in the covered planting area is absolutely prevented, and the stock is planted and developed under the best possible conditions in respect of moisture and heat. An exemplary mode of carrying out the method of the present invention is illustrated in the accompanying drawings, in which:—

Figure 1 represents a section of covering material or mulsh, applied to a planting area, having a series of hollows or depressions formed therein by rain water or water artificially applied, which water is collected in the hollows or depressions.

Fig. 2 is an enlarged cross sectional view of a portion of the mulsh showing the individual pools of water collected in the depressions in the covering which depressions follow generally the contour of the ground.

Fig. 3 is a similar view showing the planting stock planted within the depressed areas of the cover and perforating the latter.

Fig. 4 is a similar view illustrating the effect when the water has drained from the depressions and been disseminated in the soil about the lower ends of the plant stock.

Fig. 5 is a similar view showing another mode of applying the plant stock with respect to the depressions and water pools contained therein.

In my extensive investigations of the effect of mulshes in suppressing the growth of weeds and enhancing the growth of valuable plants, I have found that, if a sufficiently flexible covering or mulsh, such as would be afforded by certain grades of paper, impregnated with asphalt or the like, be laid on the surface of the soil, after the first rains fall on the covering or water is applied to the surface of the covering by artificial means, small pools of water form on the covering at those points where the surface of the soil is depressed, the weight of the water being sufficient to deflect the material of the covering into the hollows and irregularities of the soil, thereby forming basin-like depressions or hollows in the covering, which latter, because of its waterproof character, retains the pools of water until the water is evaporated or is otherwise drained off. I have found by practical experience that these basin-like depressions constitute a valuable adjunct to the successful application of the present method, as will be more particularly pointed out hereinafter.

The preferred mode of carrying out the method involves the employment of relatively thin, flexible, opaque, water-proof covering material, which is preferably of dark color and of good heat-absorbing qualities, and which may be of certain suitable grades of paper, impregnated with asphalt or the like. The covering formed by these strips is superimposed on the area to be planted in contact with the soil surface, after the land has been suitably prepared to receive the planting material. Normally, the strips constituting the covering lie in relatively flat, smooth surfaced arrangement on the top of the soil until the occurrence of rains or the application of water to the surface of the covering by artificial means. As soon as water has been applied to the surface, the thin, flexible covering sags or flexes under the weight of the water to conform to the numerous irregularities of the prepared surface of the soil, thereby producing a series of basin-like hollows or depressions corresponding generally, in number and position, with the depressions in the soil, in which basins or depressions the water immediately collects, so that the surface of a given strip of the covering or mulsh, after the water has been applied thereto, will take on the general appearance illustrated in Fig. 1, in which 1 indicates a strip or section of the mulsh or covering, and 2, the pools of water distributed at irregular intervals over the surface of the covering. As indicated, the covering strips may be applied to the planting areas of the soil immediately after the latter has been suitably prepared, and the planting is done after the first rain has fallen or after water has been applied artificially in sufficient quantities to form depressions in the body of the covering. As indicated, the planting of the slips, cuttings or other similar planting stock may be readily effected, as the material of the covering is wet and easily punctured and the basins or small pools of water indicate the proper sections or areas for planting the stock. A suitable material for the covering, for use in most cases, is one that is water-proof and that is much softer when wet than when dry, so that the cuttings, or similar plant stock may be pushed through it more easily and will, moreover, effect a clean puncture without ragged edges or lateral tears or abrasions. It is preferred that the covering be laid on the surface of planting beds which are somewhat raised, so as to permit of thorough drainage, but, while this is desirable, it is not essential, as the successful application of the method is not limited to any particular type of planting area, it being only necessary that the latter be prepared in the usual manner to leave the surfaces of the soil somewhat irregular and broken to permit the formation of depressions in the covering.

In preparing the planting stock, the slips or cuttings are preferably sharpened or beveled at their lower or soil-engaging ends and forced through the covering within the areas of the depressions formed by the water, either while the water still remains therein, or, if desired, after the water has evaporated. The cuttings may be planted in any part of the respective depressions, but preferably at the lowest points thereof, as illustrated in Fig. 3 of the drawings, from which it will be noted that each of the cuttings forms a clear puncture of the covering and each cutting also plugs the opening which it makes, so that it is impossible for any weeds which may subsequently develop to emerge between the cutting and the covering, although the water may readily seep through the covering between the stem of the slip or cutting and the edge of the punctured hole in the covering. After the planting is effected, while the depressions are filled with water, the latter seeps through the openings in the covering, as described, and is distributed about the planted end of the stock, as illustrated in Fig. 4, thereby affording the best conditions to enhance the rooting, rapid development and growth of the plants. If it is found that the depressions in the covering are not sufficiently evenly spaced or distributed to permit the planting of the stock in the deeper portions of the depressions or pools, it may be found advisable to occasionally select a planting point at one side of, but still within the margins of, the given depression, as shown in Fig 5, in which event, any water in the depression will drain through the puncture about the planted stock until it reaches the level of the puncture, the remaining water standing in the pool until it is evaporated. In such cases, the plants or cuttings get part only of the water in the respective pools, but this is usually sufficient to start the active growth and propagation of the plant, and it will be understood that any additional supply of water which comes from natural sources or artificial means will collect in the pools or depressions and be drained, through the punctured orifices in the covering, to the soil about the plants. Practically all of the water which seeps through the punctures in the covering will be available for the nourishment of the plants as the covering effectively seals the water in the soil and prevents the evaporation thereof. Any excessive amount of water which enters the soil, and cannot be absorbed by the same, will of course drain therefrom, by seepage.

It will be seen that, by the means adopted in this method, cuttings, slips, and similar plant producing stock are induced to take root and develop more rapidly into the desired plants than would otherwise be the case, because a very large portion of the water which falls upon the coverings collects in the basin-like depressions in which the stock is planted and eventually finds its way into the soil about the root ends of the plants and becomes trapped in the soil zone in which the first formed roots of the planting stock will ramify.

Furthermore, the solar heat absorbed by the covering material is radiated into the soil mass underlying the coverings, thus elevating the temperature of the soil and creating conditions in the soil, in which the cuttings have been set, which are particularly favorable to the latter. Heat and moisture, with relation to the soil, are two essential and contributing factors to early and vigorous root development in planting stock of the character indicated. Furthermore, air carried into the soil by the water draining from the depressions gives the needed aeration, particularly in conjunction with the outlet drainage from elevated planting beds.

The advantages of the method as described, are manifold, and among the same may be mentioned the following: The covering is placed in position after the ground has been prepared and is allowed to remain on the ground during the growth of the plants, so that any seeds, weeds or bulbs which may germinate and develop initially are promptly suppressed and destroyed by the overlying covering. Since the cuttings completely close the openings made in the covering at the time they are pushed through into the ground, it is quite evident that neither the cuttings nor the plants resulting therefrom can be checked or hampered by the growth of weeds as the latter have no means of egress through the covering. Therefore, it is not necessary to the success of the method that the coverings be superimposed on the planting areas for any considerable length of time before setting out the plant producing stock, or for any greater length of time than is necessary for the formation of the basin-like depressions by rain or by water artificially applied. It will also be noted that the cuttings act as pegs for holding the covering down and prevent the tendency of the wind to lift or displace the covering. It has also been observed, in practice, that the number, variation in size, and distribution of the depressions are such that very little departure is usually required from the regular or uniform system of spacing the plant producing stock, in order that the separate cuttings may be advantageously set out with reference to the depressions. The points of emergence of the cuttings will bear varying relations to the depressions, so that, under whatever conditions that arise, with respect to the rains or artificial application of moisture, whether this be heavy or light, a large proportion of the cuttings or the resulting plants growing therefrom will find conditions which are congenial to them and conducive to their rapid growth and development. If the covering were not used, as described, it is apparent that all of the cuttings or plants would suffer alike from any deficiency or excess of moisture. During a time of drought, for instance, a very light rain of brief duration would, in most cases, in the ordinary conventional practice, simply moisten, temporarily, the surface of the ground without any water penetrating the soil into the root zone. With the application of the flexible covering of waterproof material, such as I have described, it will be apparent that the sides of the basin-like depressions form water-sheds of varying size which will conduct the water, even that from a heavy mist, to the bottoms of the depressions, and such cuttings or plants as may be included within the areas of the depressions will receive the full benefit of the water thus collected, which seeps into the root zone of the subjacent soil. On the other hand, during very wet weather, since many of the cuttings will have been pushed through the covering, when being set out, at relatively elevated points with relation to the bottoms of the depressions, it will be seen that such cuttings will be favored as compared with any cuttings under similar conditions which have not been treated in accordance with the present method. Again, under the present process, when excessively wet conditions prevail, the cutting located in a depression of relatively small draining or water-shed area will not receive as much water as one in a depression of larger draining area, given the same corresponding location with respect to the bottom points of the corresponding depressions. An additional advantage of the method is that the cuttings are employed for puncturing the covering during the planting operation so that when properly carried out, the cutting seals the aperture so completely as to preclude any chance of weeds coming therethrough.

What I claim is:

1. The method of enhancing the growth and development of plants from slips, cuttings and similar planting stock, which comprises superimposing on the planting area a flexible covering of water-proof material, forming depressions in said covering, and forcing the plant stock through the covering into the soil within the depression areas.

2. The method of enhancing the growth and development of plants from slips, cuttings and similar planting stock, which comprises superimposing on the planting area a flexible covering of water-proof material, forming depressions in said covering by the application of water to the covering, and forcing the plant stock through the covering into the soil within the depression areas.

3. The method of enhancing the growth and development of plants from slips, cuttings and similar planting stock, which comprises superimposing on the planting area a covering of water-proof material in which depressions are formed to hold water, and planting the stock within the boundaries of said depressions by forcing the ends of the stock through the material of the covering into the soil.

4. The method of enhancing the growth and development of plants from slips, cuttings and similar planting stock, which comprises superimposing a flexible covering of water-proof heat-absorbing material on the planting areas, forming depressions in said covering by the application of water to the upper surface thereof, and puncturing the covering within the depression areas by means of the planting stock driven through the covering into the soil.

5. The method of enhancing the growth and development of plants from slips, cuttings and similar planting stock, which comprises superimposing on the planting areas a flexible covering, and planting the plant producing stock through the covering by forced openings therethrough with the plant producing stock as the puncturing means.

In testimony whereof I affix my signature.

CHARLES F. ECKART.